Jan. 27, 1931.　　　A. L. ADATTE　　　1,790,527
PERFORATED CONTROLLING MEANS
Filed Nov. 6, 1926　　　2 Sheets-Sheet 1
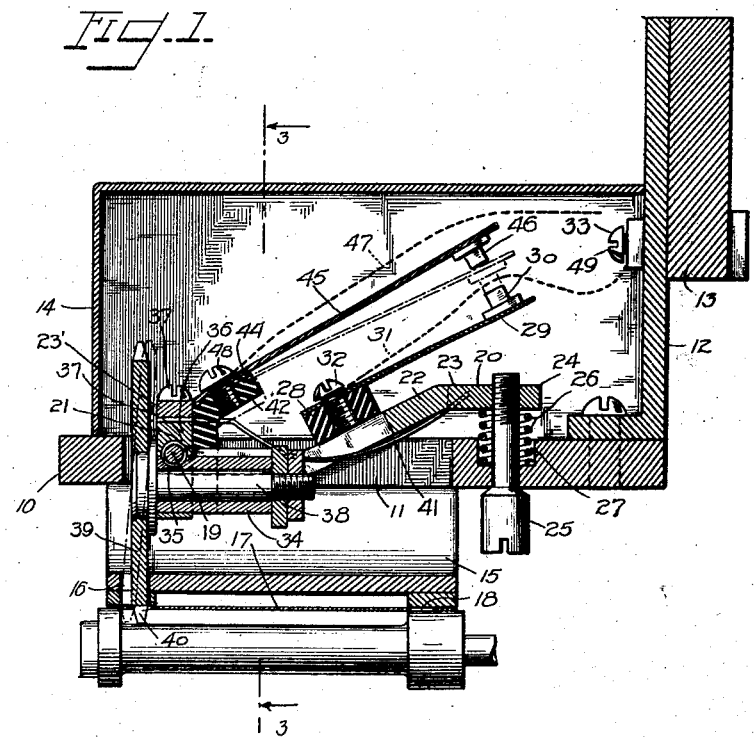
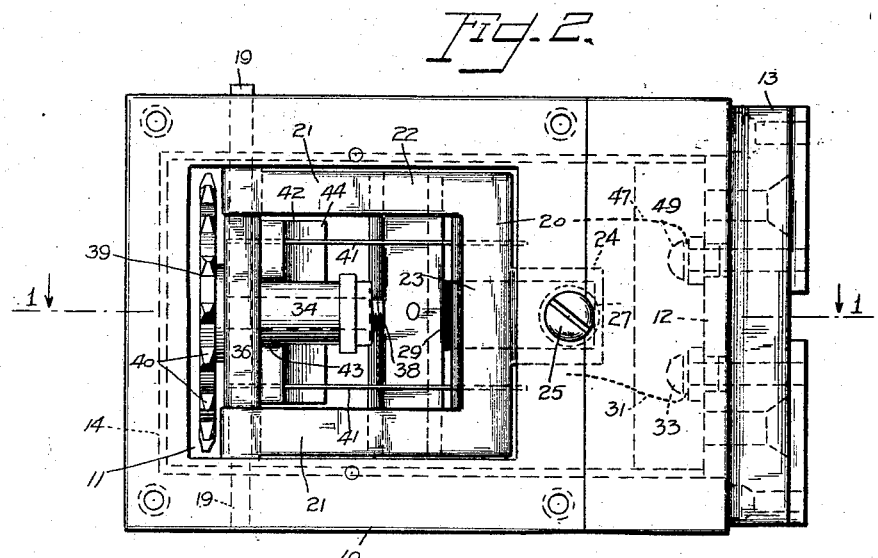
INVENTOR
ALBERT ADATTE
BY
his ATTORNEY Jan. 27, 1931.    A. L. ADATTE    1,790,527
PERFORATED CONTROLLING MEANS
Filed Nov. 6, 1926    2 Sheets-Sheet 2
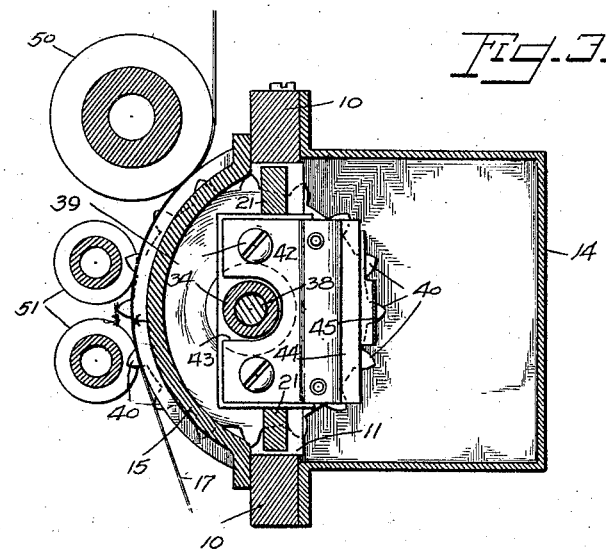
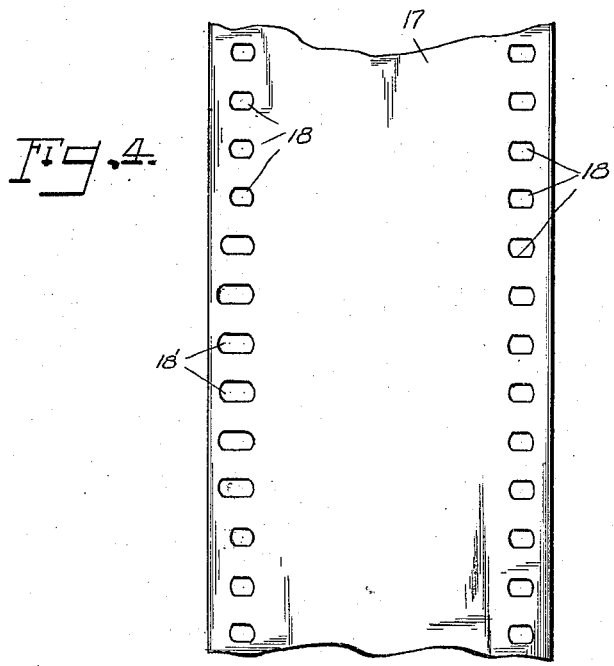
ALBERT ADATTE
INVENTOR
BY
his ATTORNEY.

Patented Jan. 27, 1931

1,790,527

UNITED STATES PATENT OFFICE

ALBERT L. ADATTE, OF BOUND BROOK, NEW JERSEY, ASSIGNOR TO PATHE EXCHANGE, INC., OF NEW YORK, N. Y., A CORPORATION OF NEW YORK

PERFORATED CONTROLLING MEANS

Application filed November 6, 1926. Serial No. 146,622.

This invention relates to electric circuit make and break apparatus and has for its object to provide a mechanically operated means controlled by special perforations in a continuously or intermittently moving strip to open and close an electric circuit or circuits.

The present invention is particularly adapted for use in connection with photographic film printing apparatus wherein separate negatives taken under different light conditions, and prints made therefrom require varying intensity of light to produce uniform results. Special perforations in the negatives at the points requiring a change in light intensity, operate to mechanically close an electric circuit which directly or indirectly regulates the intensity of the light to that desired. It is also comprehended that a device of this character is particularly adaptable for use in connection with the so called "talking motion pictures" wherein the movement of a separate phonograph record is synchronized with the speed of a motion picture film in its course through a projection apparatus. In a similar manner, the movement of a paper record in a player piano may control the movements of a phonograph record for the purpose of synchronizing the operations of the two instruments.

One embodiment of my invention is illustratively exemplified in the accompanying drawings, in which, Figure 1 is a substantially transverse sectional view of the invention taken on lines 1—1 of Figure 2, which is a front view of the device with the guide plate removed; Figure 3 is a substantially longitudinal sectional view taken on lines 3—3 of Figure 1; and Figure 4 is an elevational view of a strip of film having specal perforations for the purpose of operating the apparatus illustrated in the previous figures.

Referring to the drawings, 10 denotes a front base plate having a rectangular opening 11 adjacent one end. The back of the plate 10 at the opposite end carries a standard 12 upon which a contact block 13 is mounted. A housing 14 is attached to the back face of the plate 10 and standard 12, as illustrated in Figures 1 and 3 for the purpose of protecting the mechanism carried by the plate and projecting rearwardly through the opening 11. Secured to the front face of the plate 10 and arranged to overlie the opening 11 is a guide plate 15 which is curved in its mid portion about an axis parallel with the longitudinal dimension of the opening and at one end is provided with a flanged slot 16, while the opposite end is just flanged to accommodate the strip of film 17 being drawn thereover. The film 17 is provided at its margins with perforations 18 common to motion picture stock, the perforations at one side being adapted to pass over the slot 16, which coincides at its inner wall with the inside ends of the perforations, but which is substantially wider than the length of the ordinary film perforation and therefore projects outwardly beyond the outer ends of the said normal perforations. At intervals in the film 17, where the latter is intended to cause a change in the operation of other mechanism cooperating therewith, a number of the perforations at the side of the film, which passes over the slot 16, are increased in their dimensions, corresponding to the width of the film, to a point coincident with the width of the slot itself, so that as the perforation moves over the slot 16 the full width thereof will be effective, as hereinafter described; 18' denotes these special perforations in the film and it will be noted that the first few special perforations in the direction of travel of the film have a maximum length while the remaining number graduate in length until the normal dimension of perforation is attained.

The electric breaking and contacting mechanism is all supported on the plate 10 and comprises a pivot pin or spindle 19 carried by the plate 10 and disposed transversely of the opening 11 adjacent one end thereof. A forked member 20 is pivoted about the pin 19 at the ends of its parallel arms 21, which extend inwardly of the opening 11 for a short distance and then emerge into the chamber at the rear face of the plate 10 by slight inclined portions 22 terminating in a connecting piece 23 from which a lug 24 projects on a plane substantially parallel with that of the pivoted portion of the arms 21. The relative position of the forked member 20, with respect to the plate 10 and adjacent parts, is adjustable by means of a screw 25 which is adjustable in the lug 24 and has its head portion seated against the front face of the plate. The lug 24 is yieldably supported in its outermost position by a coiled spring 26 which engages the lug 24 at one end and seats in a pocket 27 in the plate 10, the coils of the spring being disposed about the stem of the screw 25, as illustrated in Figure 1. Mounted on the arms 21, closely adjacent the cross piece 23, is a block 28 of insulating material supporting one end of a strip of springy metal 29 having a contact member 30 at its free end. A wire 31 is led from a screw 32 holding the strip 29 to the block 28, to a binding post or screw 33 in the contact block 13. The contact member 30 will be referred to hereinafter as the stationary contact, while the one about to be described will be termed the movable contact.

The movable contact proper comprises a block 36 pivotally mounted on the pin 19 between the arms 21 of the fork member 20. A cylindrical part 34 is mounted on the face of the block 36 and is provided with a bore to support a rotary shaft 38 operating transversely of the pin 19. A sprocket 39 is carried at one end of the shaft 38, the sprocket being of sufficient diameter to project its teeth 40 beyond the flange of the slot 16 to engage the perforations 18 of the film 17. The sprocket 39 is disposed in the slot 16 so as to normally operate adjacent the inner wall thereof, and the sprocket is yieldably held in this position by means of a pair of springs 41 which are fixed at their attached ends to the block 36 by a clamping piece 23', the opposite ends of the springs bearing against the forked member 20. The block 36 further carries an insulated angle bar 42 having one arm provided with a slot 43 to straddle the cylindrical member 34, while the other arm 44 projects into the chamber at the rear of the plate 10 and carries a spring strip of metal 45 which in turn carries at its free end a contact piece 46 forming the movable contact and arranged to contact with the stationary contact member 30, as illustrated in Figure 1. A wire connection 47 is made between the screw 48 holding the strip 45 to the arm 44 and a second terminal screw 49 on the contact block 13.

In practice, the present invention operates substantially as follows:—The perforated strip of material representing the film 17 or music roll etc., in its course through its respective machine, follows the surface of a roller 50 operating over the guide plate 15 at an elevation above the point where the sprocket emerges from the slot 16. The roller 50 leads the film 17 to the surfaces of the flanges on the guide plate 15 and a pair of rollers 51 continue to hold the film in its travel over the guide. During the passage of normal perforations 18, the sprocket 39 is held in upright position by engagement of the teeth with the walls of the perforations, but when the special perforations 18' mesh with the sprocket teeth the restraining walls of the perforations are farther out, and under tension of the springs 41 the sprocket 39 swings or tilts outwardly about the pin 19, with a consequent closing of the contacts 30 and 46, as illustrated in dotted lines in Figure 1. The sprocket 39 is returned to normal position by the outer walls of the special perforations gradually becoming nearer the normal walls of the regular perforations.

Having now described the nature of my invention and the manner in which the same operates, what I desire to secure by Letters Patent is:—

1. For use in a machine of the character herein described, a strip of material having uniform marginal perforations interrupted at predetermined intervals by special perforations of increased effective area, and graduated perforations disposed between the normal perforations and the special perforations.

2. In combination, a traveling perforated strip of material, the perforations at intervals being increased in their effective area, a sprocket operating in said perforations, a yieldable pivotally mounted frame operating to carry said sprocket and capable of tilting with the sprocket as the latter enters the enlarged perforations of the material, and electric contacts, one thereof being stationary and the other carried by the sprocket frame, operating to contact when the sprocket tilts.

3. In combination, a traveling film having uniform marginal perforations interrupted at intervals by special perforations of increased effective area, a tilting sprocket operating in said perforations and interpreting the special perforations in an arcuate movement, an arm operating with the sprocket in its tilting movement, a second arm adjustable about the center of movement of the first arm, and electric contact points arranged on each arm and capable of being brought together by the tilting action of the sprocket.

4. In combination, a traveling film having marginal perforations interrupted at intervals by special perforations of increased effective area, a guide plate therefor, and means operating to interpret the special perforations in terms of arcuate movements, comprising a fixed pivot pin disposed longitudinally with respect to the line of travel of the film, a front base plate having an opening the opposite walls of which support the pivot pin, a block pivotally carried by the pin intermediate the opening in the plate and provided with a tubular portion disposed transversely of the pin, a sprocket operating in the guide and perforations of the film.

5. In combination, a traveling film having marginal perforations interrupted at intervals by special perforations having their effective axes of greater length than those of the normal perforations and disposed transversely of the line of travel of the film, an electric contacting and breaking mechanism therefor, comprising a pair of contacting members adjustable about a common axis, one thereof carrying a stationary contact and the other having a sprocket wheel operating in the perforations of the film, and means operating to normally urge the latter contact member towards the stationary contact, whereby the sprocket entering the special perforations will tilt under said means to close the contact.

6. For use in a machine of the character described, a strip of material having uniform marginal perforations interrupted at intervals by special perforations of greater width.

7. For use in connection with a machine of the character described, a strip of material having uniform marginal perforations interrupted at intervals by special perforations consisting of openings having greater widths than those of the uniform perforations, the openings having the greatest widths being disposed in the line of perforations in the direction of travel of the strip and the remaining openings having their widths graduated until the normal perforations are reached.

8. In combination, a traveling strip of material having perforations of different sizes, and a member adapted for engagement in said perforations, means for causing said member to extend into said perforations to a depth corresponding to the size thereof.

9. In combination, a traveling strip of material having perforations of different sizes, a sprocket operating in said perforations, said sprocket being movably mounted, and means for biasing said sprocket into engagement with the perforations to cause said sprocket to extend into said perforations to a depth corresponding to the size thereof.

10. The device embodied in claim 9, in combination with an electric circuit, and controlling means for said circuit operated by movement of said sprocket.

11. In combination, a traveling strip of material having perforations of different sizes, a sprocket operating in said perforations and mounted for movement transversely of said strip of material, the movement of said sprocket occurring in correspondence with the size of the perforations engaged thereby.

In testimony whereof I affix my signature.

ALBERT L. ADATTE.